W. SHAKESPEARE, Jr.
FISHING REEL.
APPLICATION FILED JULY 13, 1908.
982,305.
Patented Jan. 24, 1911.
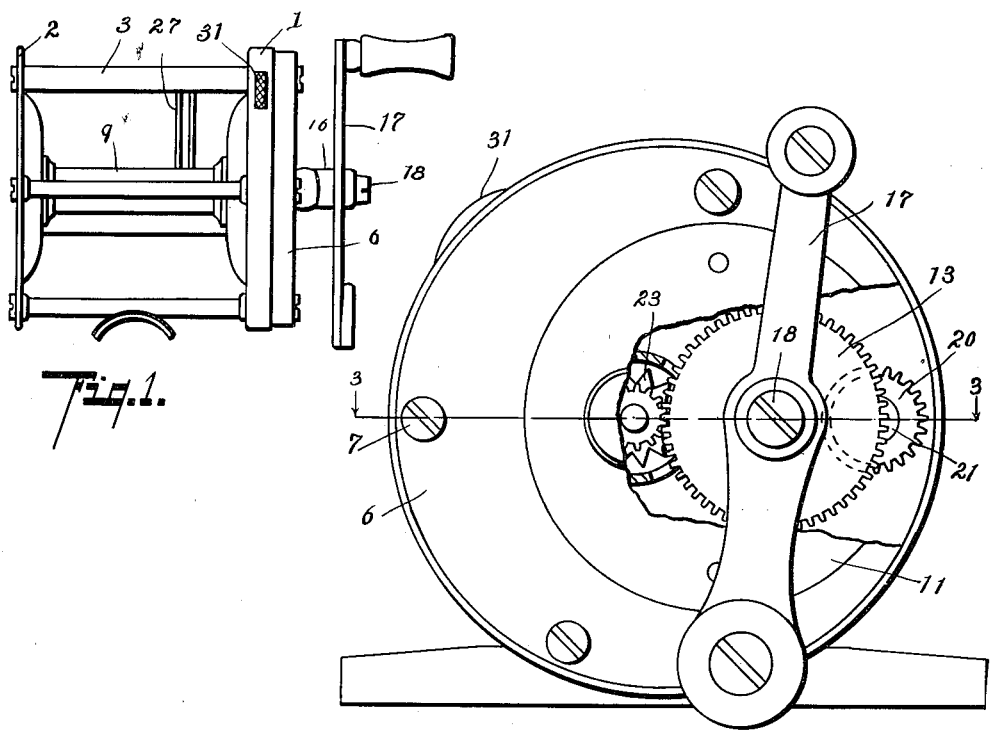
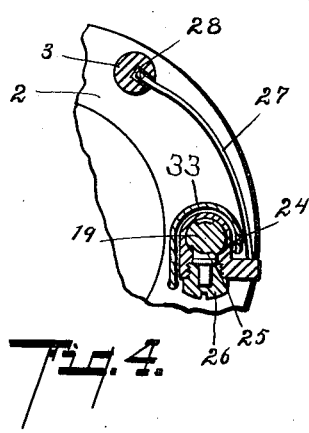
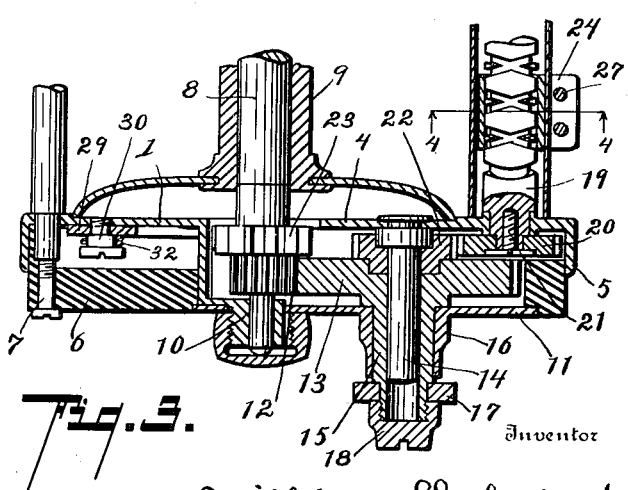

UNITED STATES PATENT OFFICE.

WILLIAM SHAKESPEARE, JR., OF KALAMAZOO, MICHIGAN, ASSIGNOR TO WILLIAM SHAKESPEARE, JR., COMPANY, OF KALAMAZOO, MICHIGAN.

FISHING-REEL.

982,305.        Specification of Letters Patent.      Patented Jan. 24, 1911.

Application filed July 13, 1908. Serial No. 443,329.

*To all whom it may concern:*

Be it known that I, WILLIAM SHAKESPEARE, Jr., a citizen of the United States, residing at Kalamazoo, Michigan, have invented certain new and useful Improvements in Fishing-Reels, of which the following is a specification.

This invention relates to improvements in fishing reels.

The main object of this invention is to provide an improved fishing reel embodying the so-called level winding feature in which the driving mechanism is very simple and compact and capable of being embodied in a reel without materially increasing the diameter or dimensions thereof over reels of the common construction and design.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which,—

Figure 1 is a side elevation of a structure embodying the features of my invention. Fig. 2 is an enlarged end elevation with parts of the head broken away to show the arrangement of the mechanism within the same. Fig. 3 is a cross section taken on a line corresponding to line 3—3 of Fig. 2. Fig. 4 is a detail section, taken on a line corresponding to line 4—4 of Fig. 3.

In the drawing, the sectional views are taken looking in the direction of the little arrows at the ends of the section lines, and similar numerals of reference refer to similar parts throughout the several views.

Referring to the drawing, the frame of my improved reel preferably consists of a chambered head 1 and a plate-like tail 2 connected by the pillars 3. The chambered head preferably consists of an inner head plate 4 having an outwardly-projecting flange 5 at its periphery adapted to receive the outer head plate 6, which is of hard rubber or other suitable material cut out to receive the mechanism.

The inner plate 4 is perforated to receive the shouldered ends of the pillars and the outer plate 6 is bored to receive the same and tapped to receive the screws 7 by which the parts of the head are secured together and to the pillars. The shaft 8 of the spool 9 is provided with bearings 10, which are carried by the face plate 11 seated in the outer head plate 6. On the spool shaft 8 is a pinion 12, with which the driving gear or pinion 13 is arranged to mesh. This driving gear or pinion is mounted on the bearing stud 14, and is provided with an outwardly-projecting hub portion 15 which projects through the bearing 16 on the face plate 11 to receive the crank 17, the crank being secured upon the hub by means of the cap nut 18.

The reversely-threaded shaft 19 is provided with a pinion 20, the pinion preferably being secured thereto by means of the screw 21 tapped into the end of the reversely-threaded shaft. The pinion 20 is arranged in mesh with the driving pinion or gear 22 mounted upon the bearing stud 14, and connected to the driving gear or pinion 13 so as to be revolved therewith, the driving gear or pinion 13 overlapping the driving gear 22 and also the shaft pinion 20.

By thus arranging the parts, they are very compactly located within the chambered head of the reel without materially increasing the dimensions thereof; further, the number of gears is reduced to a minimum and the result of driving the screw at a reduced speed relative to the spool is secured.

The click pinion 23 is arranged on the shaft 8 of the spool on the inside of the shaft pinion 12, which further economizes in space, as it enables the location of the click mechanism and the driving mechanism all within the one head, and, as previously stated, without materially increasing the diameter thereof. The lever 29 for the click is pivoted on the stud 30 and operated from the button 31. Tension is applied to the click by means of the spring 32. This click mechanism is preferably that shown in the Patent No. 734,972 issued to applicant and Walter E. Marhoff July 28, 1903, and as the details of the click mechanism form no part of this invention, I do not illustrate the same herein.

The reversely-threaded shaft 19 is provided with a carriage 24 having a shaft-engaging pin 25 which is preferably seated in the end of the screw 26 so that the parts can be readily assembled or disassembled. On the carriage 24 is a line guide eye 27 which projects upwardly therefrom, its upper end preferably engaging in the longitudinal slot 28 in the pillar located above, thereby assisting in retaining the carriage in proper position on the screw and supporting the eye.

I preferably provide the screw with a housing 33 to protect the same from water, grit and the like, which might be wiped off or freed from the line as it passes through the line guide eye.

While I preferably arrange the bearings for the gears as I have illustrated, I am aware that in varying the construction of the chambered head, different bearings might be required, but, as such variations will readily appear to those skilled in the art to which this invention relates, I do not illustrate the same herein.

Having thus described my invention, what I claim as new and desire to secure by Letters Patent is:

1. In a fishing reel, the combination of a chambered head; a spool shaft; a pinion for said spool shaft; a reversely-threaded shaft; a pinion for said reversely-threaded shaft; a crank; and a pair of driving pinions arranged side by side connected to said crank, one of said pinions being arranged to mesh with said pinion on said spool and the other with said pinion on said reversely-threaded shaft, said driving pinion for said spool being arranged on the outside of the driving pinion for said shaft and adapted to overlap the same and said pinion for said threaded shaft, all coacting for the purpose specified.

2. In a fishing reel, the combination of a chambered head; a spool shaft; a pinion for said spool shaft; a reversely-threaded shaft; a pinion for said reversely-threaded shaft; a crank; and a pair of driving pinions arranged side by side connected to said crank, one of said pinions being arranged to mesh with said pinion on said spool and the other with said pinion for said reversely-threaded shaft, all coacting for the purpose specified.

3. In a fishing reel, the combination with a chambered head, of a spool shaft; a pinion for said spool shaft; a reversely-threaded shaft; a pinion for said reversely-threaded shaft; a crank; a pair of driving pinions arranged side by side connected to said crank, one of said pinions being arranged to mesh with the pinion on said spool and the other with said pinion on said reversely-threaded shaft, said driving pinion for said spool being arranged to overlap said pinion for said threaded shaft and said driving pinion therefor; and a click pinion on said spool shaft arranged in alinement with said reversely-threaded shaft pinion and said driving pinion therefor, all coacting for the purpose specified.

4. In a fishing reel, the combination with a chambered head comprising inner and outer plates, of a spool shaft; a pinion for said spool shaft; a reversely-threaded shaft; a pinion for said reversely-threaded shaft; a pair of driving pinions arranged side by side, said pinions being of different sizes, the larger being arranged to mesh with the spool shaft pinion and the smaller with the reversely-threaded shaft pinion; a bearing stud for said driving pinions carried by the inner head plate; a hub on the outer of said driving pinions projecting through said outer head plate, said outer head plate being provided with a bearing therefor; and a crank secured to the outer end of said hub, all coacting for the purpose specified.

In witness whereof, I have hereunto set my hand and seal in the presence of two witnesses.

WILLIAM SHAKESPEARE, JR. [L. S.]

Witnesses:
LULU GREENFIELD,
JOHN WALKER.